Aug. 26, 1930.   J. PARSCHIK   1,774,399
PROCESS FOR MAKING NONALCOHOLIC BEVERAGES
Filed June 13, 1929
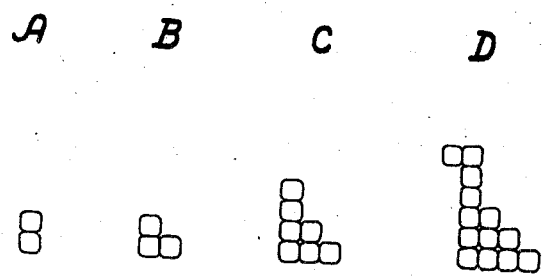
Inventor
Josef Parschik
by
A. B Foster
attorney.

Patented Aug. 26, 1930

1,774,399

UNITED STATES PATENT OFFICE

JOSEF PARSCHIK, OF VIENNA, AUSTRIA, ASSIGNOR TO CARL MAULER, OF VIENNA, AUSTRIA

PROCESS FOR MAKING NONALCOHOLIC BEVERAGES

Application filed June 13, 1929, Serial No. 370,749, and in Austria April 26, 1928.

This invention relates to the production of nonalcoholic beverages, more particularly a beer substitute and a fruit-juice beverage.

My invention consists in malting maltable grain of any kind, and preparing a wort in the known manner from the so obtained malt by extracting with water, to which wort I then impart a certain degree of acidity with the help of a bacterium cultivated from leaven. A further part of my invention consists in this, that I curtail the time during which the starch substances are allowed to change into sugar in the wort, so that I do not convert into sugar all the degradation products formed from the starch, and then I carry out the acidification of the so prepared wort by means of the said bacterium. My invention, however, also embraces a process in which the wort produced in the said manner is first fermented by means of yeast to any desired degree and is then boiled with hops. The boiling is continued until the alcohol formed by this fermentation is removed. After suitable cooling acidification is then effected in the above mentioned manner.

My invention further relates to mixing the wort obtained with a fruit juice of any kind, whereupon I effect the acidification in the above mentioned manner and to a degree which is suited to the species of fruit.

My invention will be rendered clear by the details given below.

The starting product for my process is grist from a grain which has previously been malted. Barley, wheat, oats, maize, rice, millet, Indian millet, durra, etc., are for instance applicable as such grains. I may either employ grains of one kind in the malted state or a mixture of several. The malt grist is mashed as in brewing, i. e. about 1 part of grist is mixed with about 3 parts of water, and, accompanied by heating and stirring, the enzymatic decomposition of the grist is effected. It is advantageous here but not in every case necessary to shorten the time allowed for sugar formation, so that the degradation products of the starch are partly preserved unchanged. In order to establish the correct degree of sugar conversion, I take a small specimen of the wort and mix it in the known manner with a potassium iodide solution of iodine and interrupt the formation of sugar when not yet the yellow but a reddish colour is formed in this reaction.

In order to prevent the further formation of sugar in the mash, I heat the latter for about a quarter of an hour to a temperature of approximately 80° centigrade. Thereupon I separate the liquid from the grains in the usual manner and thus obtain a wort containing extract amounting to 8–10% Balling.

After suitable cooling the wort is added with a yeast which is of such a nature that it ferments malt sugar intensively, its growth activity being small. This yeast is the same as that customarily used in the production of spirits. After about 2% of the wort extract have fermented the yeast suspended in the wort is removed in order to check further fermentation. Hops are then added and the whole boiled until the alcohol formed by the yeast fermentation is removed. The wort is now separated from the hop constituents and after cooling is mixed with a pure cultivated bacterium culture, which is obtained from leaven, for the purpose of acid fermentation. The leaven is such as is used by bakers for a true dough fermentation. The above mentioned bacteria culture is prepared by diluting leaven with sterilized water and inoculating a suitable nutrient medium with the so-obtained liquid. This nutrient medium I preferably prepare by extracting a mixture of approximately equal parts of rye and wheat bran with about four times its quantity of hot water. The solution so-obtained I then adjust to 10% Balling by addition of water and add for each 100 cm.³ of this solution 2 g. of nutrient gelatine. In order to make the bacteria colony more easily recognizable in the known manner, I mix some sterilized powdered chalk with the said solution. Into the mixture prepared in this way, one or several drops of suitably diluted leaven washings is or are introduced in the manner usual in bacteriological work, and the whole poured out into a shallow dish. After some days the colonies of the micro-organisms contained in the leaven appear. I now select the colonies of bacteria which are employed in my process. These bacteria are characterized as follows: Their size is about 0.35 $\mu$; their shape is similar to that of the micrococci and approximates to that of a rectangle. These cocci, as well as the manner in which individual members of the same combine into groups, are shown in the accompanying drawing on an enlarged scale. A shows the diplo-cocci shape, B the tricellular form. C and D show how colonies are formed by the individual cells arranging themselves into chains, the latter extending in directions perpendicular to one another. Individual motion has not been observed with this species of bacteria. The micrococcus here shown has not been known hitherto as an acid stimulator; no scientific name has been proposed for this species of cocci. Also the nutrient medium described by me is essentially new. On the other hand, the precautions described above for the cultivation of this micrococcus are not new per se, and are included in the precautions usually adopted in bacteriology when growing cultivations.

A mild acid of very desirable flavor is formed by the vital activity of these bacteria in the wort I have described. I suppose that an acid is here formed which is closely related to lactic acid.

The inoculation of the beer wort is effected in the known manner of fermentation technique; first in one part of the wort the above characterized bacteria are added for the purpose of propagating, whereupon this liquid rich in bacteria is added to the main bulk of the wort. The wort is then left to itself for some time at a suitable temperature (about 25-30° centigrade). The fermentation process is interrupted by cooling and removal of the suspended bacteria when the degree of acidity has attained an average 0.25% calculated as pure lactic acid. Finally, the obtained liquid is filtered clear, cooled, impregnated with carbonic acid under pressure and drawn off into bottles. In order that the contents may keep the filled bottles are pasteurized.

According to this process I obtain a beverage, which is coloured more or less yellow, like beer, which froths like beer and which is very much like beer in taste.

However, I can also carry out the process omitting the alcoholic fermentation by means of yeast. In this case I mix directly the wort treated with hops after clarification in the cooled state, with the pure culture of the bacteria from leaven and proceed otherwise as described. In this way I obtain a beverage which does not taste so much like beer as that previously described.

When I want to make the non-alcoholic, beer-like beverage with a fruit juice flavour, I prepare a wort, as mentioned at the beginning, from any maltable grain grist, with this difference, however, that I preferably do not interrupt the formation of sugar but carry it to completion, i. e. until the starch is completely decomposed. Since the fruit juice is a natural extract and also contains acid, I require a malt solution which is correspondingly poorer in extract. In order to prepare this, I dilute the malt solution obtained until the mixture of malt solution and fruit juice contains on an average an extract content of 10-12% Balling. The mixing ratio of fruit juice to wort may, in many cases, amount to, for example, 1:3. When fruit juices are added the boiling is carried out without adding hops. After the boiling the wort is clarified and cooled, then I add the bacteria culture prepared from leaven in the manner previously described and allow the mixture to acid ferment until it has an acidity of, on an average, 0.3%, calculated as pure lactic acid. When the desired degree of acidity is attained, the bacteria are removed with cooling and the liquid, after clarification, is impregnated with carbonic acid, drawn off into bottles, and pasteurized for the purpose of imparting keeping qualities. Most fruit juices may be employed in my process, such as, for example, the juice of pineapples, oranges, raspberries, cherries, mahaleb-cherries, lemons, apples, etc. In this manner I obtain a frothy beverage with a fruit-like taste, which is varied by the maltose of the wort, thereby obtaining a beer-like character.

I claim—

1. A process for making a non-alcoholic beverage which consists in preparing a wort by extracting malted grain of any kind by water at an elevated temperature till a speciment of the wort mixed with a potassium iodide solution of iodine not yet shows the yellow colour but gives a reddish one, preventing the further formation of sugar in the wort by raising the temperature of the latter in an appropriate degree, boiling the said wort with hops, separating it from the hops, cooling and inoculating it with a culture of bacteria prepared from leaven the individual size of the said bacteria being about 0.35 $\mu$, their shape being similar to that of the micrococci and approximating to that of a rectangle, assuming preferably the diplococci shape or a tricellular form and building colonies of individual cells arranged into chains, the latter extending in directions perpendicular to one another, leaving the so inoculated wort to itself for some time at a temperature of about 25-30° centigrade, checking the activity of the said bacteria when the degree of acidity has attained an average of about 0.25% calculated as pure lactic acid, by cooling and removing the suspended bacteria from the liquid, filtering, further cooling and impregnating the liquid with carbonic acid under pressure.

2. A process for making a non-alcoholic beverage which consists in preparing a wort by extracting malted grain of any kind by water, partly fermenting the said wort by yeast, adding hops and boiling the wort until the alcohol formed by the fermentation is removed, separating the wort from the hops, cooling and acidifying the wort by inoculating it with a culture of bacteria prepared from leaven, checking the activity of the said bacteria when the desired degree of acidity is obtained, removing the suspended bacteria from the liquid, filtering, cooling and impregnating the liquid with carbonic acid.

3. A process for making a non-alcoholic beverage which consists in preparing a wort by extracting malted grains of any kind by water for such a length of time, that the degradation products of the starch are partly preserved unchanged, checking the further formation of sugar in the wort by heating it to an appropriate temperature, separating the liquid from the grains, cooling, partly fermenting the said wort by yeast, adding hops and boiling the wort until the alcohol formed by the fermentation is removed, separating the wort from the hops, cooling and acidifying the wort by inoculating it with a culture of bacteria prepared from leaven, checking the activity of the said bacteria when the desired degree of acidity is obtained, removing the suspended bacteria from the liquid, filtering, cooling and impregnating the liquid with carbonic acid.

4. A process for making a non-alcoholic beverage which consists in preparing a wort by extracting malted grain of any kind by water at an elevated temperature till a specimen of the wort mixed with a potassium iodide solution of iodine not yet shows a yellow colour but gives a reddish one, preventing the further formation of sugar in the wort by raising the temperature of the latter to approximately 80° centigrade separating the liquid from the grains, cooling the liquid, fermenting the same by the addition of yeast removing the yeast after the desired degree of fermentation is obtained, treating with hops and boiling until the alcohol formed by the fermentation is driven off, separating the wort from the hops, cooling the same, inoculating it with a culture of bacteria prepared from leaven the individual size of the said becteria being about 0.35 $\mu$, their shape being similar to that of the micrococci and approximating to that of a rectangle, assuming preferably the diplococci shape of a tricellular form and building colonies of individual cells arranged into chains, the latter extending in directions perpendicular to one another, leaving the so inoculated wort to itself for some time at a temperature of about 25–30° centigrade, checking the activity of the said bacteria when the degree of acidity has attained an average of about 0.25% calculated as pure lactic acid, by cooling and removing the suspended bacteria from the liquid filtering, further cooling and impregnating the liquid with carbonic acid under pressure.

5. A process for making a non-alcoholic beverage which consists in preparing a wort by extracting malted grain of any kind by water, mixing the so prepared wort with fruit juice of any appropriate kind, acidifying the mixture by inoculating it with a cultude of bacteria prepared from leaven, checking the activity of the said bacteria when the desired degree of acidity is obtained, removing the suspended bacteria from the liquid, filtering, cooling and impregnating the liquid with carbonic acid.

6. A process for making a non-alcoholic beverage which consists in preparing a wort by extracting malted grain of any kind by water, heating and stirring the mixture of malted grain and water until the starch of the grain is thoroughly decomposed, adding fruit juice to the wort and diluting the mixture to about 10–20% Balling clarifying and cooling the so prepared liquid, inoculating the said liquid with a culture of bacteria prepared from leaven, the individual size of the said bacteria being about 0.35 $\mu$, their shape being similar to that of the micrococci and approximating to that of a rectangle, assuming preferably the diplo-cocci shape or a tricellular form and building colonies of individual cells arranged into chains, the latter extending in directions perpendicular to one another, leaving the so inoculated wort to itself for some time at a temperature of about 25–30° centigrade, checking the activity of the said bacteria when the degree of acidity has attained an average of about 0.25% calculated as pure lactic acid, by cooling and removing the suspended bacteria from the liquid filtering, further cooling and impregnating the liquid with carbonic acid under pressure.

In testimony whereof I affix my signature.

JOSEF PARSCHIK.